US010458378B2

(12) United States Patent
Razgani

(10) Patent No.: US 10,458,378 B2
(45) Date of Patent: Oct. 29, 2019

(54) WATER SEPARATOR AND WATER SEPARATING SYSTEM WITH INTEGRATED WATER DISCHARGE DEVICE

(71) Applicant: Mann+Hummel GMBH, Ludwigsburg (DE)

(72) Inventor: Idriss Razgani, Ludwigsburg (DE)

(73) Assignee: MANN+ HUMMEL GmbH, Ludwigsburg (DE)

( * ) Notice: Subject to any disclaimer, the term of this patent is extended or adjusted under 35 U.S.C. 154(b) by 454 days.

(21) Appl. No.: 15/067,468

(22) Filed: Mar. 11, 2016

(65) Prior Publication Data

US 2016/0265497 A1    Sep. 15, 2016

(30) Foreign Application Priority Data

Mar. 11, 2015    (DE) .................... 10 2015 003 097

(51) Int. Cl.
| | | |
|---|---|---|
| *F02M 37/24* | (2019.01) | |
| *B01D 36/00* | (2006.01) | |
| *B01D 24/02* | (2006.01) | |
| *B01D 17/04* | (2006.01) | |
| *B01D 17/02* | (2006.01) | |
| *B01D 17/00* | (2006.01) | |
| *C02F 1/40* | (2006.01) | |

(52) U.S. Cl.
CPC ......... *F02M 37/24* (2019.01); *B01D 17/0214* (2013.01); *B01D 17/045* (2013.01); *B01D 17/08* (2013.01); *B01D 24/02* (2013.01); *B01D 36/006* (2013.01); *C02F 1/40* (2013.01); *B01D 2201/0415* (2013.01); *B01D 2201/295* (2013.01)

(58) Field of Classification Search
CPC .... B01D 36/006; B01D 24/02; B01D 17/045; B01D 17/0214; B01D 17/08; B01D 2201/295; B01D 2201/0415; F02M 37/221; C02F 1/40
See application file for complete search history.

(56) References Cited

U.S. PATENT DOCUMENTS

| | | |
|---|---|---|
| 8,815,090 B2 | 8/2014 | Beard et al. |
| 2015/0267658 A1* | 9/2015 | Girondi ................ B01D 36/006 210/437 |

FOREIGN PATENT DOCUMENTS

| | | | |
|---|---|---|---|
| DE | 102009058812 A1 | 6/2011 | |
| DE | 102010030987 A1 | 1/2012 | |
| DE | 102013202718 A1 | 8/2014 | |
| WO | WO-2014057323 A1 * | 4/2014 | ........... B01D 36/006 |

* cited by examiner

*Primary Examiner* — Krishnan S Menon
*Assistant Examiner* — Waqaas Ali
(74) *Attorney, Agent, or Firm* — James Hasselbeck

(57) ABSTRACT

A water separator for water contained in fuel or oil, including: a water outlet for the water separated from the fuel or oil; and a water discharge device having an inlet opening; and an outlet opening for the water conveyed out of the water separator; wherein the inlet opening is eccentric to a longitudinal axis of the water separator; wherein an axial direction is a direction parallel to the longitudinal axis and a radial direction is a direction traverse to the longitudinal axis; wherein the inlet opening is arranged on the water separator and spaced axially away from the water outlet; and wherein the outlet opening is arranged on the water separator coaxially to the longitudinal axis of the water separator.

11 Claims, 3 Drawing Sheets

WATER SEPARATOR AND WATER SEPARATING SYSTEM WITH INTEGRATED WATER DISCHARGE DEVICE

TECHNICAL FIELD

The invention relates to a water separator and a water separating system for water contained in fuel or oil having an integrated water discharge device.

BACKGROUND OF THE INVENTION

Fuels or oil frequently contain water, which can lead to malfunctions in the machines operated with the fuel or oil, in particular internal combustion engines. As a result, water separating systems having a water separator have been used for some time to separate or remove the water contained in the fuel or oil. Depending upon the design, the water separators include a support tube, which is provided with an end plate at both ends. Arranged inside the support tube is a screen tube, which together with the support tube delimits a water separating gap. The water separating gap is used for the gravity-related deposition of the water contained in the fuel or oil and is fluidically connected at one end to a water outlet arranged at the lower end of the water separator.

Such a water separator is known for example from DE 10 2010 030 987 A1.

When the water separator is in operation, the separated water flows as a rule, due to gravity, from the water separator into a water collection chamber arranged beneath the water separator. The water collection chamber can be formed for example by the separator housing of the water separating system. When a maximum water fill level is reached within the water collection chamber, the accumulated water must be removed from the water collection chamber however. For this purpose, the housing of the water separating system can include for example a base-side water drain device, in the simplest case structurally, a so-called drain screw. In practice, it has been proven in tight installation conditions, such as in the engine compartment of a motor vehicle, if the water separator itself is provided with a water discharge device. In this way, the water accumulated in the water collection chamber can be discharged as needed from the water collection chamber via the water separator in an upward direction.

A water separator having such an integrated water discharge device is known from DE 10 2009 058 812 A1. The water discharge device of the water separator has an inlet or outlet opening, which is arranged eccentrically on the water outlet side, i.e., in the installed state of the water separator on the lower end of the water separator and at an axial distance from the second end plate. An outlet opening of the water discharge device is associated, in the installed state of the water separator, with the upper end plate of the water separator and arranged eccentrically to the longitudinal axis of the water separator. A connection of the water discharge device to a water discharge connecting piece of a separator housing is thereby made difficult. In addition, the water separator requires a relatively large installation space due to the structural design of the water separating device thereof.

EP 2 135 659 A1 discloses another water separator for water contained in fuel. The water separator has a water separating device, which is upstream from a particle filter medium in the flow direction of the fuel and which is therefore arranged on the so-called raw or dirty side of the water separator. The water separator consequently has a less efficient water separating capacity.

SUMMARY OF THE INVENTION

The problem addressed by the invention is to specify a water separator of the type cited at the outset and a water separating system, which are compact and cost-effective to fabricate with an efficient separation performance and which, with a simplified assembly of the water separator in the separator housing of the water separating system, at the same time make possible a discharge of the water separated from the fuel or oil from the water collection chamber arranged beneath the water separator via the water separator.

The water separator according to the invention can be realized with an especially simple and compact structure. The water discharge device of the water separator makes a water discharge possible for the water separated from the fuel or oil and conveyed out of the water separator via the water outlet from a water collection chamber of a water separating system that is arranged beneath the water separator. Due to the fact that the outlet opening of the water discharge device is arranged coaxially to the longitudinal axis of the water separator, an assembly of the water separator in the separator housing of a water separating system is simplified considerably. Thus, when connecting the outlet opening of the water discharge device to a water discharge connecting piece of the separator housing, it is not necessary to pay attention to any specific rotational position of the water separator relative to the separator housing. In addition, the risk of an incorrect assembly of the water separator or a damage of the water separator can thereby be counteracted.

According to a preferred embodiment of the invention, the inlet opening and the outlet opening of the water discharge device are fluidically connected to each other by means of a first water discharge pipe, which is arranged inside the water separator running in the direction of the longitudinal axis of the water separator. The first water discharge pipe can, in the simplest design case, thereby be arranged running coaxially to the longitudinal axis of the water separator and form the outlet opening. The arrangement of the first water discharge pipe running coaxially to the longitudinal axis of the water separator offers fabrication-related advantages and permits an especially cost-effective and simple manufacture of the water separator.

According to the invention, the water separator can include a support tube and a screen tube arranged inside the support tube, which jointly delimit a water separating gap. The water separating gap is connected at one end to the water outlet. The screen tube functions in terms of a final separator for the water being separated from the fuel or oil and makes possible a further improved separating efficiency. The screen tube can include in this regard in particular hydrophobic surface properties. The water is able to be deposited downwards from the fuel due to gravity into the water separating gap.

The first water discharge pipe arranged running coaxially to the longitudinal axis of the water separator and inside the screen tube offers, with this water separator design, the advantage that the water separating gap that is essential for the water separating efficiency of the water separator is not constricted by the first water discharge pipe. A functional impairment of the water separator can thereby be reliably prevented.

The first water discharge pipe and the screen tube can according to the invention be connected to each other via spacer elements. The screen tube and the first water discharge pipe can thereby be configured together as one piece, preferably together with the spacer elements. As a result, the screen tube and the water discharge pipe can be fabricated and mounted as a single plastic injection molded part. This offers advantages in terms of cost and makes low manufacturing tolerances of the water separator possible. The screen tube can also be reinforced internally by the spacer elements with a small material insert. This is advantageous particularly when using a coalescing medium or particle filter medium supported externally on the support tube.

The inlet opening of the water discharge device is formed in the simplest design case by a second water discharge pipe. The second water discharge pipe is thereby preferably arranged offset in a direction radial to the longitudinal axis of the water separator, i.e., laterally, wherein the first and the second water discharge pipes are fluidically connected to one another via a connection channel running in the radial direction. As a result, the water separator can be used in difficult installation conditions in a separator housing of a separating system.

The connection channel is sealed axially in the direction of the inlet opening of the water discharge device, i.e., on its side of the second (lower) end plate pointing away from the first end plate, preferably by a base plate. The base plate can thereby be configured advantageously as one piece with the second water discharge pipe, in particular as a plastic injection molded part. This offers advantages in terms of cost. The base plate can also be sealingly clipped into the second end plate of the water separator associated with the water outlet or be held in another manner.

With respect to an even more cost-effective and simpler fabrication of the water separator, the support tube and the two end plates can be configured together as one piece. The support tube and the two end plates can thereby be designed in particular as a single plastic injection molded part.

A (clean-side) annular ascension pipe for the fuel or the oil is preferably configured between the screen tube and the water discharge pipe. The ascension pipe is fluidically connected to a fluid outlet of the water separator for the fuel or the oil. In the simplest design case, the fluid outlet is formed by the first end plate arranged at the top when the water separator is in operation or be delimited by said end plate in a direction radial to the longitudinal axis of the water separator.

According to the invention, the water separator can include two end plates, i.e., a first upper and a second lower end plate. The two ends plates of the water separator each thereby include preferably a sealing element for circumferential sealing contact of the water separator on a separator housing of a water separating system. The sealing elements can thereby be arranged in a circumferential groove of the respective end plate, which is configured on the end plate on the inner circumferential side or the outer circumferential side. The sealing element preferably consists of an elastomer and can be designed in particular as an O-ring.

The separation performance of the water separator can be further improved again by the use of a coalescing medium. The coalescing medium is thereby preferably arranged between the two end plates annularly around the support tube and is supported thereon, preferably directly. With this design, the fuel or oil is therefore able to flow through the coalescing medium from the outside inwardly in a direction radial to the longitudinal axis of the water separator.

In accordance with an embodiment according to the invention, the water separator can additionally or alternatively include a particle filter medium, which is arranged between the two end plates annularly around the support tube. The particle filter medium is thereby preferably kept embedded in the end plates at both ends or fused/adhered to the end plates in a fluid-tight manner. With this design, the water separator is therefore used at the same time to filter out particulate impurities from the fuel or oil. In other words, the water separator is configured as a combination separator.

The aforementioned coalescing medium or particle filter medium is covered by the two end plates of the water separator advantageously in the axial (or even in the radial) direction. When installing the water separator in a separator housing of a water separating system, it is thus possible to prevent undesirable damage to the coalescing medium or particle filter medium.

The water separating system according to the invention has a separator housing with a water separator, as explained in the foregoing, which is arranged in the separator housing. The separator housing includes a base-side water collection chamber, which is arranged beneath the water outlet of the water separator. The inlet opening of the water discharge device of the water separator is arranged in the water collection chamber of the separator housing. The separator housing includes a water discharge connecting piece, which is fluidically connected to the outlet opening water discharge device of the water separator. Provided that the outlet opening of the water discharge device of the water separator is formed by the first water discharge pipe, the water discharge connecting piece of the separator housing can be placed (sealingly), in particular on the first water discharge pipe or else extend (sealingly) into the first water discharge pipe.

According to a preferred further development of the invention, the water collection chamber of the separator housing includes a recess on the base side, which is arranged laterally offset from the longitudinal axis of the water separator and which preferably annularly encompasses the longitudinal axis of the water separator. The second water discharge pipe of the water discharge device of the water separator extends in this case with the inlet opening thereof into said recess. On the one hand, a complete or an almost complete water discharge of the water accumulated in the water collection chamber is thereby made possible upwardly via the water separator. On the other hand, a sensor unit can thereby be arranged on the housing base of the separator housing on the longitudinal axis of the water separator in order to detect a water fill level inside the water collection chamber.

BRIEF DESCRIPTION OF THE DRAWINGS

The invention will be explained in the following on the basis of an exemplary embodiment depicted in the drawing. The drawing shows.

DESCRIPTION OF THE INVENTION

Figure 1:
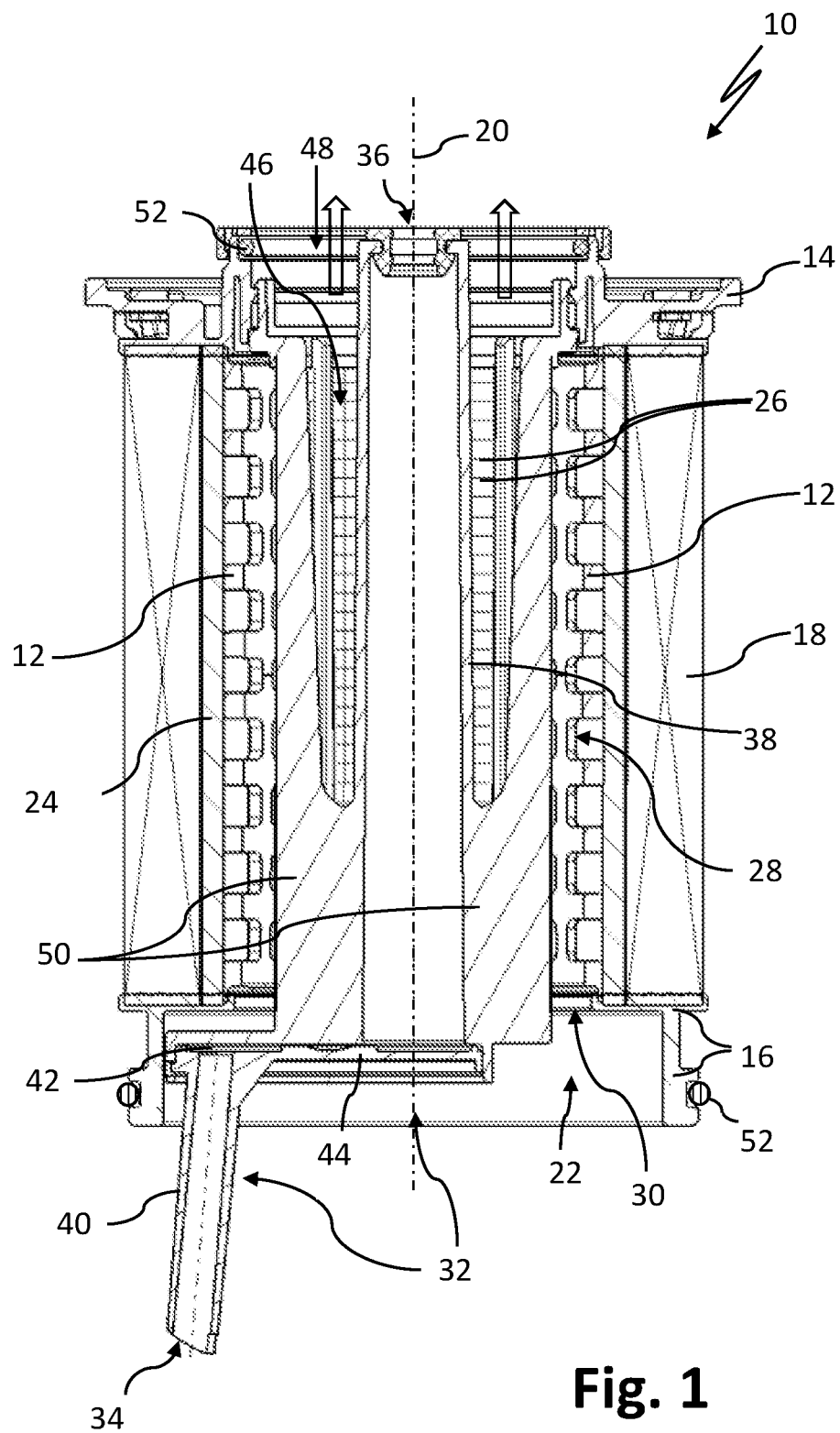
FIG. 1 A longitudinal section of a water separator with a particle filter medium and with a water separating device that is fluidically downstream from the particle filter medium, which water separating device includes a coalescing medium and a screen tube serving as a final separator, wherein the water separator has a water discharge device with a water discharge pipe arranged in sections inside the screen tube.

FIG. 1 shows a water separator 10 with a support tube 12, which is provided at both ends with a respective end plate 14, 16. In the installed state of the water separator 10, a first end plate 14 is arranged at the top in the direction of gravity, while a second end plate 16 is arranged at the bottom or pointing downward.

The water separator 10 includes a filter medium 18, which is arranged between the two end plates 14, 16 annularly around the support tube 12. The filter medium 18 is supported on the inside on a support tube 12 configured in a grid-like manner in a direction radial to the longitudinal axis 20 of the water separator 10. The filter medium 18 can be fused on one side to the two end plates 14, 16 or be sealingly embedded in the material of the two end plates 14, 16. The filter medium 18 is configured in the present case as a star-shaped folded bellows and the to-be-filtered fuel or oil can flow through it from the outside inwardly in a direction radial to the longitudinal axis 20 of the water separator 10.

The water separator 10 includes a water separating device having a coalescing medium 24, a screen tube 26 serving as a final separator and a water separating gap 28 formed between the screen tube 26 and the support tube 20. The coalescing medium 24 is fluidically downstream from the particle filter medium (clean side) and arranged annularly around the support tube 12 in a manner corresponding to the particle filter medium 18. The coalescing medium 24 lies directly against the support tube 24 and is supported thereon. It is understood that the coalescing medium 24 may be formed of a plurality of coalescing layers, which can differ from one another in particular in terms of the material properties or thicknesses thereof (e.g., coarse coalescing layer/fine coalescing layer).

The water separator 10 includes a water outlet 30, which is fluidically connected to the water separating gap 28. The water separating gap 28 is therefore configured to be downwardly open. The water outlet 30 is delimited in a direction radial to the longitudinal axis 20 of the water separator 10 on the outside by the lower second end plate 16.

The water separator 10 includes a water discharge device 32 integrated into the water separator for the discharge of water from a water collection chamber of a separator housing (depicted in more detail in FIG. 3) of a water separating system, which chamber is arranged beneath the water separator 10. The water discharge device 32 includes a suction or inlet opening 34 pointing downward when the water separator is in operational use and an upper outlet opening 36.

The outlet opening 36 is arranged coaxial to the longitudinal axis 20 of the water separator 10 and formed by a first water discharge pipe 38. The first water discharge pipe 38 is inside the screen tube 26 and arranged running coaxially to the longitudinal axis 20 of the water separator 10.

The inlet opening 34 of the water discharge device 32 is formed by a second water discharge pipe 40, which extends away in the axial direction from the second end plate 16 having the water outlet 30. The second water discharge pipe 40 is arranged on the water separator 10 offset in a radial direction relative to the longitudinal axis 20 and can be arranged, as shown in FIG. 1, running oblique to the longitudinal axis 20 of the water separator 10.

The first and the second water discharge pipes 38, 40 are fluidically connected to each other via a radially running connection channel 42. The connection channel 42 is sealed downwardly by a base plate 44.

Configured between the screen tube 26 and the first water discharge pipe 38 is an ascension pipe 46 for the fuel or the oil flowing through the screen tube. The ascension pipe 46 is fluidically connected on the outlet side to a fluid outlet 48 of the water separator 10 for the fuel or the oil flowing out of the water separator. The ascension pipe 46 is sealed downwardly, in this case in the region of the second end plate 16.

The first water discharge pipe 38 and the screen tube 26 are configured as one piece as a single plastic injection molded part and connected to each other via rib-like or wing-like spacer elements 50. The spacer elements are used for an internal reinforcement of the screen tube 26.

The spacer elements 50 also serve as a fastening of the screen tube 26 and of the first water discharge pipe 38 on the first end plate 14. The spacer elements 50 can be clipped into the upper end plate 14 for this purpose, as shown in FIG. 1. The base plate 44 is clipped into the lower end plate 16 of the water separator 10 together with the water discharge pipe 40 formed onto the base plate 44.

The two end plates 14, 16 each include a (radial) sealing element 52 for the sealing contact of the water separator 10 on a separator housing of a water separating system. The sealing elements 52 are each arranged in an annular groove (not designated in more detail) of the respective end plate 14, 16.

Figure 2:
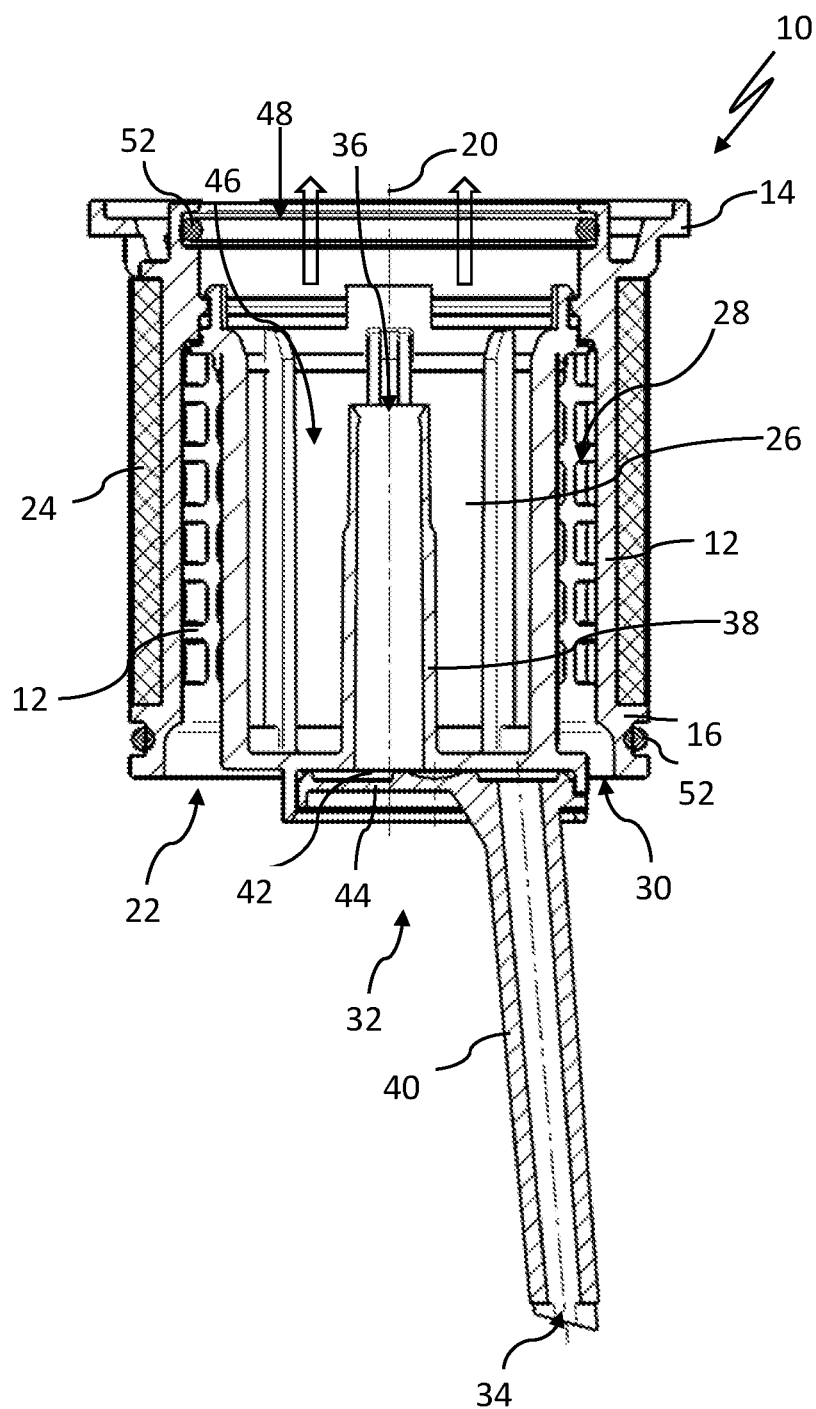

FIG. 2 shows another exemplary embodiment of the water separator 10. The water separator 10 differs substantially from the water separator shown in FIG. 1 in that it does not include a filter medium. In addition, both end plates 14, 16 are designed as one piece with the support tube 12 as a single plastic injection molded part. The first water discharge pipe 38 is designed to be shorter and does not extend completely through the water separator 10. The outlet opening 36 of the first water discharge pipe 38 is thereby arranged in the axial direction between the two end plates 14, 16.

Figure 3:
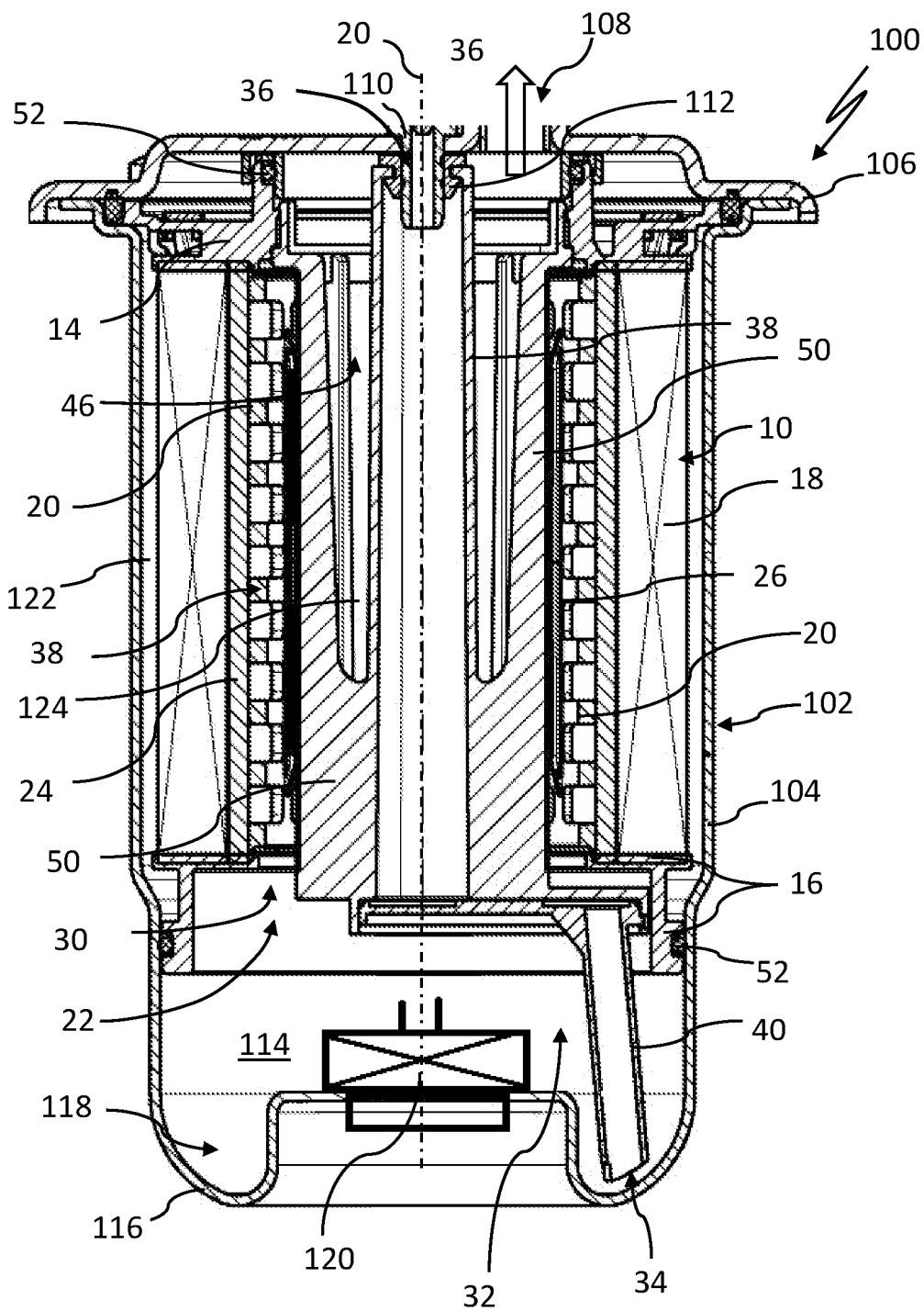
FIG. 3 A longitudinal section of another exemplary embodiment of a water separator with a simplified design as compared to the water separator according to FIG. 1, and FIG. 2 A longitudinal section of a water separating system having a separator housing and a water separator according to FIG. 1 arranged in the separator housing.

FIG. 3 shows a longitudinal section of a water separating system 100. The water separating system 100 has a separator housing 102 with a housing trough 104 and with a housing cover 106. The separator housing 102 can be made both of plastic as well as metal. Arranged in the separator housing 100 is a water separator 10 explained in the foregoing in conjunction with FIG. 1. The housing cover 104 includes a fluid inlet (not shown in more detail) for the fuel being conveyed to the water separator 10 or the oil being conveyed to the water separator and a fluid outlet 108 for the fuel or the oil flowing out of the water separator. A water discharge connecting piece 110 of the separator housing 102 is sealingly inserted into the outlet opening 36 of the first water discharge pipe 40 of the water separator 10. The water outlet connecting piece is sealed on the circumferential side against the first water discharge pipe 38 by means of sealing ring 112.

The water separating system 100 includes a water collection chamber 114 for receiving the water separated from the fuel or the oil. The water collection chamber 114 is arranged, in the operating state of the water separating system 100, beneath the water separator 10 so that water separated in the water separator 10 reaches the water collection chamber 114, due to gravity, via the water outlet 30 of the water separator 10.

The water collection chamber 114 includes a recess 118 on the housing base 116, which recess is arranged laterally offset from the longitudinal axis 20 of the water separator 10. The recess 118 can be configured to be annular, as shown in FIG. 3, and therefore annularly encompass the longitudinal axis 20 of the water separator 10. The inlet opening 34 of the water discharge device 32 of the water separator 10 is arranged inside the recess 118 and near to the housing base 116 due to the second water discharge pipe 40 of the water separator 10 extending into the recess 118. As a result, as needed, a complete or almost complete water discharge of the water accumulated in the water collection chamber 114 is made possible via the water separator 10 in an upward direction. Mounted on the housing base 116 of the separator housing 102 is a water level sensor 120, by means of which a maximum permissible water fill level in the water collection chamber 114 can be detected. The water level sensor is mounted on the longitudinal axis of the water separator 10.

The water separator 10 fits sealingly on the inside on the separator housing via the sealing elements 52 of the two end plates 14, 16 thereof. Because of the sealing elements 14, 16, a raw side 122 that is fluidically upstream from the filter medium 18 of the water separator 10 and a clean side 124 of the water separator 10 or of the separating system 100 that is fluidically downstream from the filter medium are sealed against each other.

What is claimed is:

1. A water separator for water contained in fuel or oil, comprising:
a water outlet for the water separated from the fuel or oil; and
a water discharge device having
an inlet opening; and
an outlet opening for the water conveyed out of the water separator;
wherein the inlet opening is eccentric to a longitudinal axis of the water separator;
wherein an axial direction is a direction parallel to the longitudinal axis and a radial direction is a direction traverse to the longitudinal axis;
wherein the inlet opening is arranged on the water separator and spaced axially away from the water outlet; and
wherein the outlet opening is arranged on the water separator coaxially to the longitudinal axis of the water separator;
wherein the water separator includes:
a support tube;
a screen tube arranged inside of the support tube; and
wherein the support tube is spaced apart radially outwardly away from the screen tube, such that annular space between the support tube and the screen tube forms an annular water separating gap positioned radially between the support tube and the screen tube;
wherein the inlet opening and the outlet opening of the water discharge device are fluidically connected to each other by, in combination:
a first water discharge pipe, which is arranged centrally in the water separator, the first water discharge pipe arranged within a radial interior of the screen tube and within a radial interior of the support tube;
wherein the first water discharge pipe extends in a direction of the longitudinal axis of the water separator;
a second water discharge pipe forming the inlet opening of the water discharge device,
wherein the second water discharge pipe is arranged on the water separator and offset in the radial direction from the longitudinal axis of the water separator;
a base plate forming a connection channel arranged running in a radial direction, the connection channel fluidically connecting the first water discharge pipe (38) to the second water discharge pipe.

2. The water separator according to claim 1, wherein the first water discharge pipe is arranged running coaxially to and arranged directly on the longitudinal axis of the separator, wherein the first water discharge pipe forms the outlet opening.

3. The water separator according to claim 1, wherein the water outlet of the water separator is delimited at least in sections by a lower end plate of the water separator.

4. The water separator according to claim 1, wherein the water separating gap is fluidically connected at one end to the water outlet of the water separator.

5. The water separator according to claim 4, wherein a coalescing medium and/or a filter medium are arranged annularly encircling the support tube and are supported on the support tube.

6. The water separator according to claim 4, wherein an ascension pipe for the fluid is arranged between the screen tube and the first water discharge pipe; wherein the ascension pipe is fluidically connected to a fluid outlet of the water separator.

7. The water separator according to claim 1, wherein the base plate is formed onto the second water discharge pipe;
wherein the connection channel is sealed axially in the direction of the inlet opening of the water discharge device by the base plate.

8. The water separator according to claim 4, wherein the first water discharge pipe and the screen tube are formed together as a unitary, monolithic, one-piece component as in an injection molded plastic part.

9. The water separator according to claim 4, wherein the support tube, a first end plate and a second end plate of the water separator are formed together as a unitary, monolithic, one-piece component as in an injection molded plastic part.

10. The water separator according to claim 1, wherein the water separator is provided with an end plate at both ends, wherein the two end plates each comprise a sealing element for circumferential sealing contact of the water separator on a separator housing of a water separating system.

11. The water separator according to claim 10, wherein the sealing element is arranged in an annular groove of the first or second end plate;
wherein the annular groove is arranged on an inner circumferential side or an outer circumferential side of the respective end plate.

* * * * *